US012401479B2

United States Patent
Xia et al.

(10) Patent No.: US 12,401,479 B2
(45) Date of Patent: Aug. 26, 2025

(54) METHODS, APPARATUS AND SYSTEMS FOR SWITCHING BETWEEN BANDWIDTH PARTS

(71) Applicant: ZTE Corporation, Shenzhen (CN)

(72) Inventors: Shuqiang Xia, Shenzhen (CN); Feng Xie, Shenzhen (CN); Ying Liu, Shenzhen (CN); Tao Qi, Shenzhen (CN); Yan Xue, Shenzhen (CN); Kun Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 569 days.

(21) Appl. No.: 17/554,766

(22) Filed: Dec. 17, 2021

(65) Prior Publication Data

US 2022/0216970 A1 Jul. 7, 2022

Related U.S. Application Data

(63) Continuation of application No. PCT/CN2019/091989, filed on Jun. 20, 2019.

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0061* (2013.01); *H04L 1/1812* (2013.01); *H04W 72/23* (2023.01)

(58) Field of Classification Search
CPC ... H04L 5/0053; H04L 1/0061; H04L 1/1812; H04W 72/23
See application file for complete search history.

(56) References Cited

U.S. PATENT DOCUMENTS 10,833,753 B2 * 11/2020 Cirik ..................... H04W 72/30
10,873,936 B2 * 12/2020 Huang .................. H04L 5/0098
(Continued)

FOREIGN PATENT DOCUMENTS

CN 108135028 A * 6/2018 ......... H04L 41/0806
CN 109548147 A 3/2019
(Continued)

OTHER PUBLICATIONS

Freda et al.—U.S. Appl. No. 62/784,040 for U.S. Patent Publication 2022/0061055 (Year: 2018).*
(Continued)

*Primary Examiner* — Nicholas R Taylor
*Assistant Examiner* — Angela Widhalm De Rodriguez
(74) *Attorney, Agent, or Firm* — Crowell & Moring LLP (57) ABSTRACT

Methods, apparatus and systems for switching between bandwidth parts in a wireless communication are disclosed. In one embodiment, a method performed by a wireless communication node is disclosed. The method comprises: configuring a first type bandwidth parts (BWPs) for a wireless communication device, wherein the first type BWP includes a single BWP configured for downlink transmission to the wireless communication device; configuring at least two second type BWPs for the wireless communication device, wherein the at least two second type BWPs include two BWPs configured respectively for uplink and downlink transmissions regarding the wireless communication device; and transmitting indication information on a second type BWP in the at least two second type BWPs to the wireless communication device, wherein the indication information indicates a service type of a planned transmission of the wireless communication node on the first type BWP.

21 Claims, 5 Drawing Sheets

(51) Int. Cl.
*H04L 1/1812* (2023.01)
*H04W 72/23* (2023.01)

(56) References Cited

U.S. PATENT DOCUMENTS

| | | | |
|---|---|---|---|
| 2019/0052377 A1 | 2/2019 | Hwang et al. | |
| 2019/0132109 A1 | 5/2019 | Zhou et al. | |
| 2019/0132855 A1 | 5/2019 | Lee et al. | |
| 2019/0149305 A1* | 5/2019 | Zhou | H04L 5/0092 370/330 |
| 2019/0215870 A1* | 7/2019 | Babaei | H04L 5/0092 |
| 2020/0396684 A1* | 12/2020 | Lin | H04W 52/0216 |
| 2020/0413345 A1* | 12/2020 | Yao | H04W 52/54 |
| 2021/0144700 A1* | 5/2021 | Lee | H04L 5/0094 |
| 2022/0061055 A1* | 2/2022 | Freda | H04W 72/1263 |
| 2022/0086860 A1* | 3/2022 | Panteleev | H04W 4/40 |
| 2023/0079660 A1* | 3/2023 | Fu | H04L 5/0044 370/329 |

FOREIGN PATENT DOCUMENTS

| | | |
|---|---|---|
| CN | 109586881 A | 4/2019 |
| CN | 109803422 A | 5/2019 |
| KR | 20190038300 A | 4/2019 |
| WO | WO 2019/080939 A1 | 5/2019 |
| WO | WO 2019/095251 A1 | 5/2019 |
| WO | WO 2019096150 A1 | 5/2019 |

OTHER PUBLICATIONS

Freda et al.—U.S. Appl. No. 62/840,797 for U.S. Patent Publication 2022/0061055 (Year: 2019).*
International Search Report for Application No. PCT/CN2019/091989 mailed Mar. 19, 2020 (2 pages).
ZTE, "Initial consideration on NR V2X resource allocation", 3GPP TSG-RAN WG2#103bis, R2-1814168, Oct. 12, 2018 (7 pages).
Canadian Examination Report for Canadian Application No. 3141346 mailed May 22, 2024 (6 pages).
Huawei, HiSilicon, 3GPP TSG RAN WG1 Meeting #95, R1-1812241, Nov. 12, 2018 (4 pages).
Chinese First Office Action issued in CN Application No. 2019800976537 including English translation mailed Sep. 27, 2024 (29 pages).
Examination Report issued in Canadian Patent Application No. 3,141,346, dated May 29, 2025, (5 pages).

* cited by examiner

(12) United States Patent — excerpt

METHODS, APPARATUS AND SYSTEMS FOR SWITCHING BETWEEN BANDWIDTH PARTS

CROSS-REFERENCE TO RELATED APPLICATION

This application is a continuation of International Patent Application No. PCT/CN2019/091989, filed Jun. 20, 2019. The contents of International Patent Application No. PCT/CN2019/091989 are incorporated by reference herein in their entirety.

TECHNICAL FIELD

The disclosure relates generally to wireless communications and, more particularly, to methods, apparatus and systems for switching between bandwidth parts in a wireless communication.

BACKGROUND

In order to provide a larger system and a better user experience in a fifth-generation (5G) new radio (NR) network, NR base stations can often support a large bandwidth. For example, below 6 GHz, a NR base station may support a maximum bandwidth of 400 MHz by a single carrier. To let a user equipment (UE) to support such a large system bandwidth will increase the cost and power consumption of the UE. As such, the concept of bandwidth part (BWP) has been introduced in 5G systems. A BWP refers to a continuous bandwidth. The UE does not need to support data transmission and reception in the entire system bandwidth, but only needs to support data transmission and reception within the bandwidth of the BWP.

In an existing 5G system, each UE is equipped with up to four pairs of BWPs on each carrier. Each pair of BWPs includes an uplink BWP and a downlink BWP. A UE may have only one pair of active BWPs at a time. The base station can choose to activate different BWPs according to service changes of different UEs.

An existing 5G system does not support multicast services. The above mentioned BWP design is mainly designed for unicast services. With the wide application of multicast services in the fields of Internet of Things, public safety, autonomous driving, entertainment multimedia, etc., a 5G system may be designed with a special BWP to support multicast services. A UE that supports multicast services typically also supports unicast services. Correspondingly, a UE generally receives or transmits unicast data on a unicast BWP, and receives multicast data on a multicast BWP. Due to the difference in unicast and multicast service attributes, an efficient way is desired to enable the UE to switch from unicast BWP to multicast BWP for data reception, or enable to switch from multicast BWP to unicast BWP for data reception and transmission.

Thus, existing systems and methods for BWP configuration in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: configuring a first type bandwidth part (BWP) for a wireless communication device, wherein the first type BWP includes a single BWP configured for downlink transmission to the wireless communication device; configuring at least two second type BWPs for the wireless communication device, wherein the at least two second type BWPs include two MVPs configured respectively for uplink and downlink transmissions regarding the wireless communication device; and transmitting indication information on a BWP in the at least two second type BWP to the wireless communication device, wherein the indication information indicates a service type of a planned transmission of the wireless communication node on the first type BWP.

In another embodiment, a method performed by a wireless communication node is disclosed. The method comprises: configuring a first type bandwidth part. (BWP) for a wireless communication device, wherein the first type BWP includes a single BWP configured for downlink transmission to the wireless communication device; configuring at least two second type BWPs for the wireless communication device, wherein the at least two second type BWPs include two BWPs configured respectively for uplink and downlink transmissions regarding the wireless communication device; and transmitting indication information on the first type BWP to the wireless communication device, wherein the indication information indicates an end of service of the wireless communication node on the first type BWP.

In a further embodiment, a method performed by a wireless communication device is disclosed. The method comprises: receiving a configuration of a first type bandwidth part (BWP) from a wireless communication node, wherein the first type BWP includes a single BWP configured for downlink transmission to the wireless communication device; receiving a configuration of at least two second type BWPs for the wireless communication device, wherein the at least two second type BWPs include two BWPs configured respectively for uplink and downlink transmissions regarding the wireless communication device; and receiving indication information on a BWP in the at least two second type BWPs from the wireless communication node, wherein the indication information indicates a service type of a planned transmission of the wireless communication node on the first type BWP.

In yet another embodiment, a method performed by a wireless communication device is disclosed. The method comprises: receiving a configuration of a first type bandwidth part (BWP) from a wireless communication node, wherein the first type MVP includes a single BWP configured for downlink transmission to the wireless communication device; receiving a configuration of at least two second type BWPs for the wireless communication device, wherein the at least two second type BWPs include two BWPs configured respectively for uplink and downlink transmissions regarding the wireless communication device; and receiving indication information on the first type BWP from the wireless communication node, wherein the indication information indicates an end of service of the wireless communication node on the first type BWP.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. A UE may be configured with different types of bandwidth parts (BWPs), e.g. multicast BWPs and unicast BWPs. The present teaching discloses systems and methods for a UE to efficiently switch from a unicast BWP to a multicast MVP, and in turn to efficiently switch from a multicast BWP to a unicast BWP.

The methods disclosed in the present teaching can be implemented in a wireless communication network, where a ES and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

Figure 1:
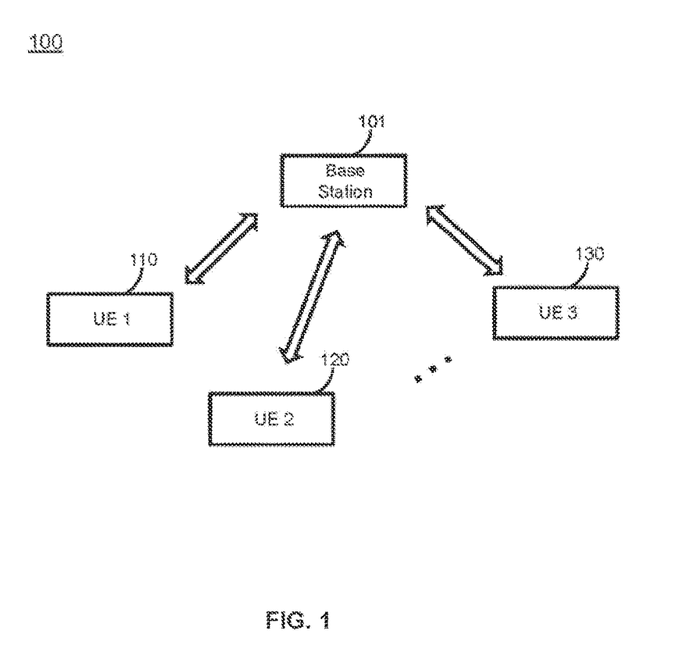
FIG. 1 illustrates an exemplary communication network in which techniques disclosed herein may be implemented, in accordance with an embodiment of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. Each UE may be configured with a first type BWP and at least two second type BWPs. The first type BWP is a single BWP that is not paired with another first type BWP. The at least two second type BWPs include two BWPs with opposite link directions, one uplink BWP and one downlink MVP. In one embodiment, the first type BWP is configured for transmissions based on broadcast or multicast to the UE; and each second type BWP is configured for unicast transmissions to and from the UE. In one embodiment, a UE may be configured with multiple first type BWPs and one or more sets of second type BWPs.

Figure 2:
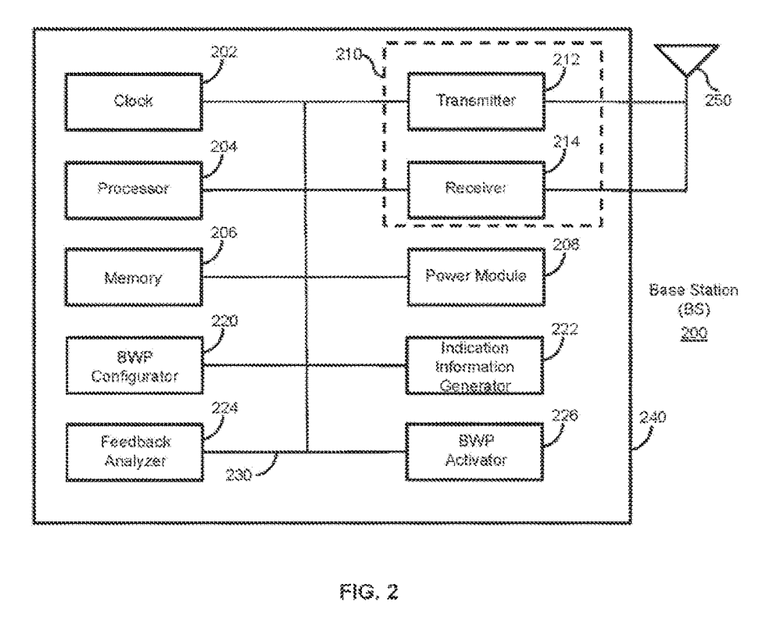
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a node or device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a BWP configurator 220, an indication information generator 222, a feedback analyzer 224, and a BWP activator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may transmit data to and receive data from a UE using BWPs. The BWP configurator 220 in this example can configure a first type BWP for a UE and at least two second type BWPs for the UE. The first type BWP includes a single BWP configured for downlink transmissions to the UE; while the at least two second type BWPs include two BWPs configured respectively for uplink and downlink transmissions regarding the UE. Among the first type BWP and the at least two second type MVPs, at most one BWP is active for one link direction at one time. Each BWP of the first type BWP and the at least two second type BWPs is configured with: time frequency domain position information; a control resource set (CORESET); and/or a search space. In one embodiment, the single BWP is configured for transmissions based on broadcast or multicast; and each BWP in the at least two second type BWPs is configured for unicast transmissions.

In one embodiment, the indication information generator 222 can generate indication information that indicates a service type of a planned transmission of the BS 200 on the single BWP. The indication information generator 222 then transmits, via the transmitter 212, the indication information on a BWP in the at least two second type BWPs to the UE. In one example, the indication information may be carried by a physical downlink control channel on a control resource set (CORESET) of the BWP. A cyclic redundancy check (CRC) of the physical downlink control channel is scrambled by a predetermined radio network temporary identifier (RNTI) that is different from a RNTI used for scrambling a CRC of a physical downlink control channel for scheduling service on the BWP. In another example, the indication information is carried by a media access control (MAC) control element (CE) on a physical downlink shared channel on the BWP based on a hybrid automatic repeat request (HARQ) mechanism. In either example, the indication information may comprise a RNTI to be used for scrambling a CRC of a physical downlink control channel for the planned transmission of the wireless communication node on the single BWP.

In one embodiment, the indication information generator 222 can generate indication information that indicates an end of service of the BS 200 on the single BWP. The indication information generator 222 then transmits, via the transmitter 212, the indication information on the single BWP to the UE The indication information may be carried by one of: a physical downlink control channel on a control resource set (CORESET) of the single BWP; and a media access control (MAC) control element (CE) on a physical downlink shared channel on the single BWP. A configuration of the physical downlink shared channel can be indicated by the physical downlink control channel.

In one example, a cyclic redundancy check (CRC) of the physical downlink control channel is scrambled by a radio network temporary identifier (RNTI) that is used for scrambling a CRC of a physical downlink control channel for scheduling service on the single BWP to a plurality of UEs associated with the BS 200. Each of the plurality of UEs may perform a detection on the physical downlink control channel based on the RNTI. The plurality of UEs will switch to their respective second type BWPs, upon receiving the indication information on the single BWP.

In another example, a cyclic redundancy check (CRC) of the physical downlink control channel is scrambled by a radio network temporary identifier (RNTI) that is a cell RNTI configured for the UE to receive data on a BWP in the at least two second type BWPs. The UE may perform a detection on the physical downlink control channel based on the cell RNTI and will switch to the BWP according to a predetermined agreement upon receiving the indication information on the single BWP.

In yet another example, a cyclic redundancy check (CRC) of the physical downlink control channel is scrambled by a radio network temporary identifier (RNTI). The RNTI is selected from a group including a first RNTI and a second RNTI. The first RNTI is used for scrambling a CRC of a physical downlink control channel for scheduling service on the single BWP. The second RNTI is a cell RNTI configured for the wireless communication device to receive data on a BWP in the at least two second type BWPs based on a predetermined agreement. The UE may perform a detection on the physical downlink control channel based on both the first RNTI and the second RNTI.

The feedback analyzer 224 in this example may receive, via the receiver 214 from the UE, and analyze a feedback that indicates whether or not the UE will switch to the single BWP to receive data. The UE may make a decision on whether to switch to the single MVP based on at least one selected from the group of: the service type of the planned transmission; a status of unicast data communication of the UE; an interest of the UE; a service need of the UE; and a priority of services with respect to the UE. In one embodiment, the feedback analyzer 224 may determine that no feedback is received from the UE regarding the indication information; and determine, based on a predetermined agreement, whether the UE will switch to the single BWP to receive data when no feedback is received. After the feedback analyzer 224 determines that the UE will switch to the single BWP to receive data, the MVP activator 226 in this example may deactivate the BWP where the UE is currently on, and enable the single BWP to be active after a switch delay.

Upon receiving the indication information on the single BWP, the UE may switch to a BWP that is one of: a latest BWP where the UE is on before switching to the single BWP; an initial BWP configured for the UE; and a default BWP configured for the UE. In one embodiment, if the UE receives both the indication information and a signaling inconsistent with the indication information in a same time slot, the UE may ignore the inconsistent signaling and perform in accordance with the end of service of the BS 200 on the single BWP.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the BWP configurator 220. Conversely, each of the modules illustrated in FIG. 2 can be implemented using a plurality of separate components or elements.

Figure 3:
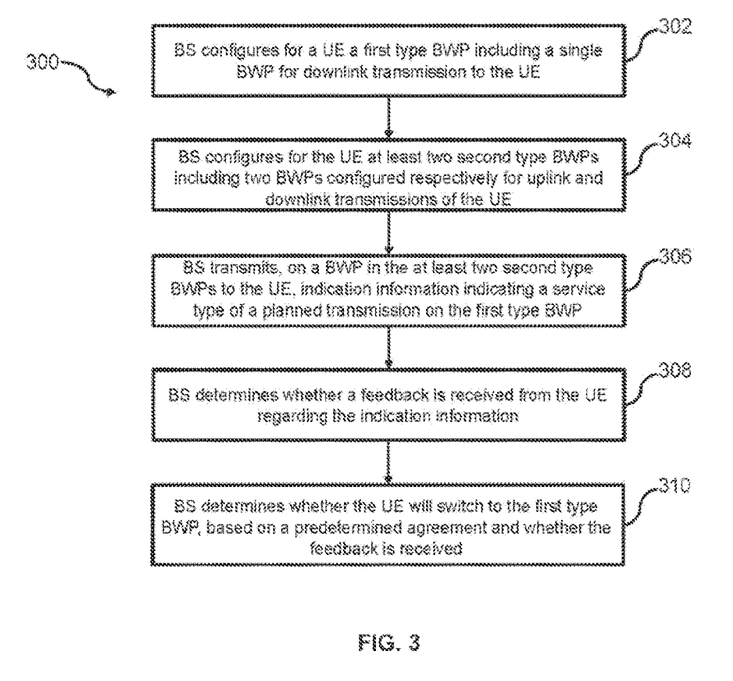
FIG. 3 illustrates a flow chart for a method performed by a BS for switching between bandwidth parts, in accordance with some embodiments of the present disclosure.

FIG. 3 illustrates a flow chart for a method 300 performed by a BS, e.g. the BS 200 in FIG. 2, for switching between BWPs, in accordance with some embodiments of the present disclosure. At operation 302, the BS configures for a UE a first type BWP including a single BWP for downlink transmission to the UE. At operation 304, the BS configures for the UE at least two second type BWPs including two BWPs configured respectively for uplink and downlink transmissions of the UE. The BS transmits, at operation 306 on a BWP in the at least two second type BWPs to the UE, indication information indicating a service type of a planned transmission on the first type BWP. At operation 308, the BS determines whether a feedback is received from the UE regarding, the indication information. At operation 310, the BS determines whether the UE will switch to the first type BWP, based on a predetermined agreement and whether the feedback is received. The order of the operations shown in FIG. 3 may be changed according to different embodiments of the present disclosure.

Figure 4:
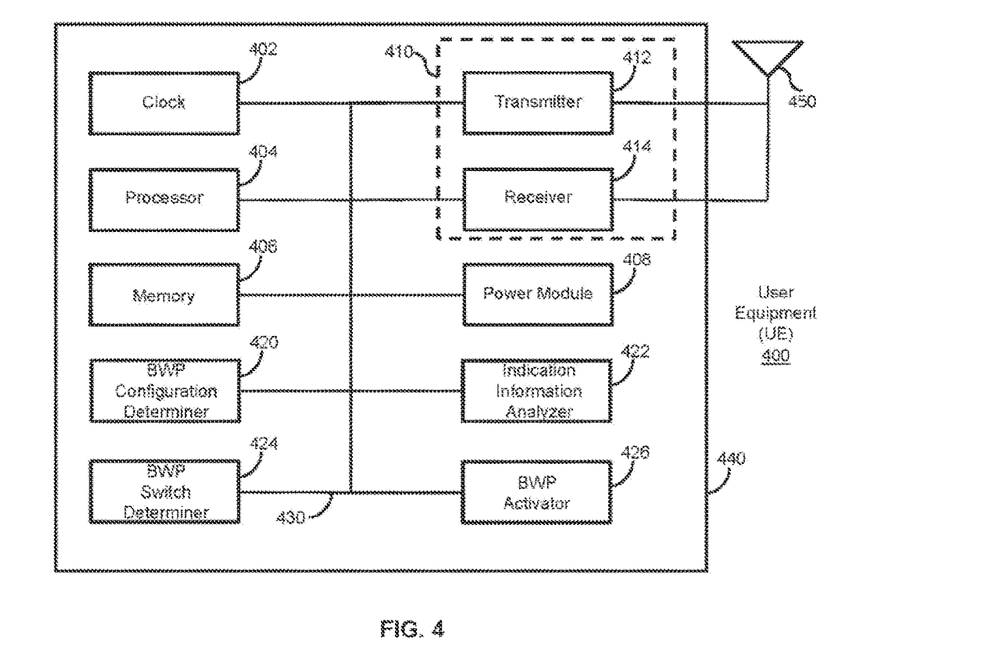
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a BWP configuration determiner 420, an indication information analyzer 422, a BWP switch determiner 424, and a BWP activator 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The BWP configuration determiner 420 in this example may receive from a BS a first type BWP and at least two second type BWPs. The first type BWP includes a single BWP configured for downlink transmission to the UE 400; while the at least two second type BWPs include two BWPs configured respectively for uplink and downlink transmissions regarding the UE 400. Among the first type BWP and the at least two second type BWPs, at most one BWP is active for a link direction at one time. Each BWP of the first type BWP and the at least two second type BWPs is configured with: time frequency domain position information; a control resource set (CORESET); and/or a search space. In one embodiment, the single BWP is configured for transmissions based on broadcast or multicast; and each BWP in the at least two second type BWPs is configured for unicast transmissions.

The indication information analyzer 422 in this example receives, via the receiver 414, and analyzes indication information on a BWP in the at least two second type BWPs from the BS. The indication information indicates a service type of a planned transmission of the BS on the single BWP. In one example, the indication information is carried by a physical downlink control channel on a control resource set (CORESET) of the BWP. A cyclic redundancy check (CRC) of the physical downlink control channel is scrambled by a predetermined radio network temporary identifier (RNTI) that is different from a RNTI used for scrambling a CRC of a physical downlink control channel for scheduling service on the BWP. In another example, the indication information is carried by a media access control (MAC) control element (CE) on a physical downlink shared channel on the BWP based on a hybrid automatic repeat request MAW) mechanism. In either example, the indication information may comprise a RNTI to be used for scrambling a CRC of a physical downlink control channel for the planned transmission of the BS on the single BWP. In one embodiment, the indication information analyzer 422 may receive, in a same time slot, both the indication information and a signaling inconsistent with the indication information. In this case, the UE 400 may perform in accordance with the end of service of the BS on the single BWP, while ignoring the inconsistent signaling.

In one embodiment, the indication information analyzer 422 receives, via the receiver 414, and analyzes indication information on the single BWP from the BS. The indication information indicates an end of service of the BS on the single BWP. The indication information may be carried by one of: a physical downlink control channel on a control resource set (CORESET) of the single BWP; and a media access control (MAC) control element (CE) on a physical downlink shared channel on the single BWP. A configuration of the physical downlink shared channel is indicated by the physical downlink control channel.

In one embodiment, a cyclic redundancy check (CRC) of the physical downlink control channel is scrambled by a radio network temporary identifier (RNTI) that is used for scrambling a CRC of a physical downlink control channel for scheduling service on the single BWP to a plurality of UEs associated with the BS. Each of the plurality of UEs may perform a detection on the physical downlink control channel based on the RN TI. The plurality of UEs will switch to their respective second type BWPs, upon receiving the indication information on the single BWP.

In another embodiment, a cyclic redundancy check (CRC) of the physical downlink control channel is scrambled by a radio network temporary identifier (RNTI) that is a cell RN TI configured for the UE 400 to receive data on a BWP in the at least two second type BWPs. The UE 400 may perform a detection on the physical downlink control channel based on the cell RNTI. The UE 400 may switch to the BWP according to a predetermined agreement upon receiving the indication information on the single BWP.

In yet another embodiment, a cyclic redundancy check (CRC) of the physical downlink control channel is scrambled by a radio network temporary identifier (RNTI) that is selected from a group including a first RNTI and a second RNTI. The first RNTI is used for scrambling a CRC of a physical downlink control channel for scheduling service on the single BWP. The second RNTI is a cell RNTI configured for the UE 400 to receive data on a BWP in the at least two second type BWPs based on a predetermined agreement. The UE 400 may perform a detection on the physical downlink control channel based on both the first RNTI and the second. RNTI.

The BWP switch determiner 424 in this example determines whether to switch to the single BWP based on at least one selected from the group of: the service type of the planned transmission; a status of unicast data communication of the UE 400; an interest of the LSE 400; a service need of the UE 400; and a priority of services regarding the UE. Upon receiving the indication information on the single BWP, the BWP switch determiner 424 may determine that the UE 400 will switch to a BWP that is one of: a latest BWP where the UE 400 is on before switching to the single BWP; an initial BWP configured for the UE 400; and a default BWP configured for the UE 400.

The BWP switch determiner 424 in this example may make a decision on whether to switch to the single BWP to receive data. In one embodiment, the BWP switch determiner 424 may transmit, via the transmitter 412, a feedback to the BS. The feedback indicates whether or not the UE 400 will switch to the single BWP to receive data. In another embodiment, the BWP switch determiner 424 may determine, based on a predetermined agreement, that there is no need to transmit a feedback about the decision. After the BWP switch determiner 424 determines to switch to the single BWP to receive data, the BWP activator 426 may deactivate the BWP where the UE 400 is currently on, and activate the single BWP after a switch delay.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the BWP configuration determiner 420, Conversely, each of the modules illustrated in FIG. 4 can be implemented using a plurality of separate components or elements.

Figure 5:
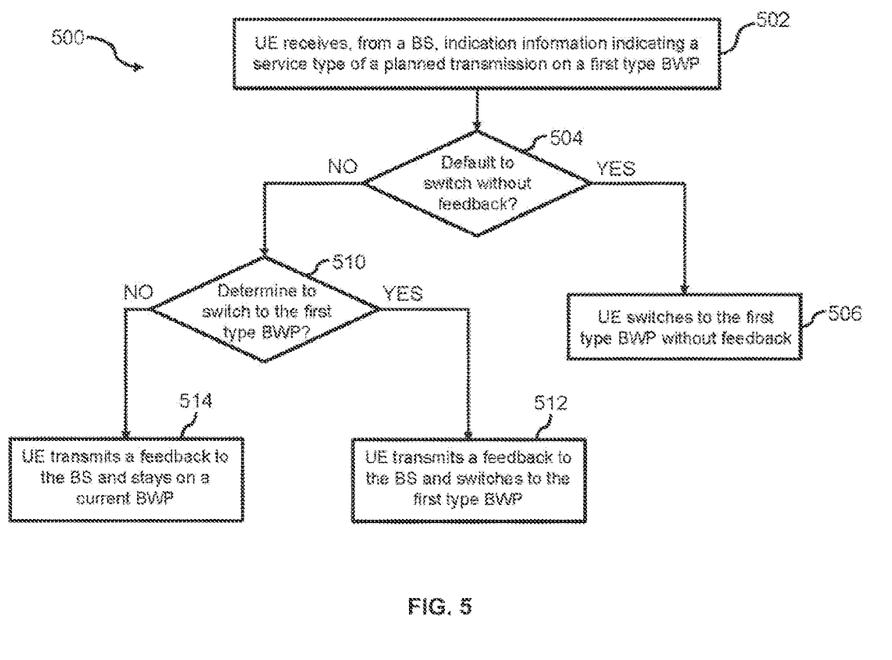
FIG. 5 illustrates a flow chart for a method performed by a UE for switching between bandwidth parts, in accordance with some embodiments of the present disclosure.

FIG. 5 illustrates a flow chart for a method 500 performed by a UE, e.g. the UE 400 in FIG. 4, for switching between MVPs, in accordance with some embodiments of the present disclosure. At operation 502, the UE receives from a BS indication information indicating a service type of a planned transmission on a first type BWP. At operation 504, the UE determines that whether the service type is default for the UE to switch to the first type BWP without feedback. If so, the process goes to operation 506, where the UE switches to the first type BWP without giving a feedback to the BS. Otherwise, the process goes to operation 510.

At operation 510, the UE determines whether to switch to the first type BWP. If so, the process goes to operation 512 where the UE transmits a feedback to the BS and switches to the first type BWP. Otherwise, the process goes to operation 514 where the UE transmits a feedback to the BS and stays on a current BWP without switching. The order of the operations shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, a BS configures for a UE a first type BWP and at least two second type BWPs. The at least two second type MVPs comprise a downlink BWP and a corresponding uplink BWP. The first type BWP is a single directional BWP and has no paired first type BWP corresponding to an opposite link direction. When a second type BWP having an opposite link direction from the first type BWP is active, the first type BWP may be paired with the active second type BWP. The BWP configuration information comprises frequency domain positions of the BWPs, CORESET resources of each first type and second type BWP, the search spaces of the BWPs. At a same time, only one BWP of a UE is active for a link direction. That is, at most one uplink BWP of the UE is active at one time; and at most one downlink BWP of the UE is active at one time.

The first type BWP can be used to support the transmission of multicast services. For a multicast service, the base station can send the same data to multiple UEs by using one resource on the BWP. When the number of users is relatively large, the base station can achieve a very high spectrum efficiency. This can be widely applied to the Internet of Things, public safety, autonomous driving, entertainment multimedia and other fields. This type of BWP is referred to as multicast BWP. The second type of BWP can be used to support traditional unicast services. This type of BWP is referred to as unicast BWP.

Without loss of generality, it is assumed in this embodiment that the UE resides on a second type BWP, i.e. the second type BWP is active. The base station may transmit a physical downlink control channel (PDCCH) on the CORESET of the second type BWP. The PDCCH carries indication information indicating a service type of a planned transmission on the first type BWP.

At the UE side, the UE performs a detection on the PDCCH. Based on the detected service type indication information, the UE may determine whether to switch to the first type BWP, and transmit a feedback to the base station to indicate whether to switch to the first type BWP. The UE has a relatively large autonomy in this scheme on determining whether to switch to the first type BWP. For example, the UE may determine whether to switch to the first type BWP according to: the service type indication information, its current receiving or transmission status of the unicast service, the interest of the UE, etc. For instance, it is provided that the UE detects the PDCCH while still processing data on a physical downlink shared channel (PDSCH) on the second type of BWP. If the data on the second type of BWP is correctly detected, the UE may transmit a feedback to the base station to indicate switching to the first type MVP; if the data on the second type of BWP is not correctly detected the UE may then transmit a feedback to the base station to indicating continuing to stay on the second type BWP, so that the base station can continue to schedule the service on the second type BWP.

When the UE is switched to the first type BWP, the second type BWP where the UE currently resides on is deactivated, and the first type BWP becomes active after a BWP switch delay. If the terminal determines to switch to the first type BWP, the terminal may also reside on the second type BWP for a certain time period before switching to the first type BWP. Before switching to the first type BWP, the second type BWP is still active except the BWP switch delay.

Further, regarding whether a feedback to the base station is needed about whether to switch to the first type BWP, the base station and the UE may also have a predetermined agreement. For example, they can agree that a feedback to the base station is needed only when the UE determines to switch to the first type BWP. That is, no feedback means that the UE does not switch to the first type BWP. Alternatively and equivalently, the base station and the UE may also agree that a feedback to the base station is needed only when the UE determines not to switch to the first type BWP. That is, no feedback means that the UE will switch to the first type BWP.

The base station and the terminal UE can agree in advance that, for one or more designated service types transmitted on the first type BWP, the terminal will by default switch to the first type BWP upon receiving the service type indication information. In this case, the terminal does not need to transmit a feedback to the base station to indicate the BWP switching.

For the PDCCH that indicates the service type of the first type BWP and is transmitted on the second type BWP, the PDCCH uses a predetermined RNTI as a mask of the CRC portion of the PDCCH. The mask is different from a mask used for the CRC portion of the PDCCH configured for scheduling services on the second type BWP.

The service type indication information carried by the PDCCH may be a RNTI. The RNTI is used as a mask for the CRC portion of the PDCCH transmitted on the first type BWP. If the UE switches to the first type BWP, the RNTI can be used to detect service data transmitted on the first type BWP. FIG. 5 shows a schematic diagram of data processing performed by a terminal according to the received indication information indicating a service type on the first type BWP.

At the base station side, the base station can select different processing mechanisms in accordance with a determination of whether the UE is going to switch to the first type BWP. The determination may be based on a feedback from the UE and/or a predetermined agreement between the base station and the UE. For example, if the UE sends a feedback indicating the UE is not going to switch to the first type BWP, the base station may continue scheduling unicast services for the UE on the second type BWP. In another example, if the UE sends a feedback indicating the UE is going to switch to the first type BWP, the base station transmits multicast service on the first type BWP. When the base station transmits the multicast service and determines the modulation coding scheme (MCS) and resource allocation, the base station may consider the signal-to-noise ratio (SNR) at the position of the UE. The base station may determine MCS and resource allocation based on multiple UEs receiving data on the first type BWP.

In this embodiment, the UE can decide whether to switch to the first type BWP to receive service according to its own service needs and service priorities. This improves the user experience while reducing the power consumption of the UE. The base station may know exactly whether the UE is on the first type BWP or the second type BWP, according to a feedback from the UE or a predetermined agreement. This avoids an ambiguity about where the UE's carrier is, which enables a scheduling policy suitable to the type of BWP where the UE is located. Therefore, the spectral efficiency of the system is effectively improved.

In a second embodiment, the BWP configuration and indication information transmission are similar to those in the first embodiment, except that the indication information indicating the service type to be transmitted on the first type BWP is carried by a MAC CE on the second type BWP. Further, the MAC CE also indicates the residence time information for the UE to stay on the first type BWP. If the base station configures a plurality of first type BWPs for the UE, the MAC CE can also carry index information of the plurality of first type BWPs. Compared to the first embodiment, the MAC CE in the second embodiment is transmitted in one PDSCH. In addition, HARQ can be performed, which provides a higher communication reliability.

In a third embodiment, switching from multicast BWP to unicast BWP is considered. A BS configures for a UE a first type BWP and at least two second type BWPs. The at least two second type BWPs comprise a downlink BWP and a corresponding uplink BWP. The first type BWP is a single directional BWP and has no paired first type BWP corresponding to an opposite link direction. When a second type BWP having an opposite link direction from the first type BWP is active, the first type BWP may be paired with the active second type BWP. At a same time, only one BWP of a UE is active for a link direction. That is, at most one uplink BWP of the UE is active at one time; and at most one downlink BWP of the UE is active at one time.

Without loss of generality, it is assumed in this embodiment that the UE resides on a first type BWP, i.e. the first type BWP is active. The base station may transmit a physical downlink control channel (PDCCH) on the CORESET of the first type BWP. The PDCCH carries indication information indicating an end of service of the first type BWP.

Further, the above-described PDCCH uses a RNTI as a mask for the CRC of the PDCCH. The RNTI may be one of the following two types: a first type RNTI corresponding to a PDCCH used for scheduling services on the first type BWP; and a second type RNTI that is a cell RNTI allocated by the base station to the UE for the second type BWP.

The first type RNTI is related to the services on the first type BWP. This type of RNTI is often shared by a plurality of UEs. When the base station uses the first type RNTI, it means services associated with the RNTI have ended. The UEs receiving information with the first type RNTI will switch to their respective second type BWPs. Further, according to the first embodiment, this RNTI is the same as a RNTI carried by the indication information that indicates services of the first type BWP and is transmitted on the second type BWP.

The second type RNTI may be UE specific and used for service scheduling of PDSCH or PUSCH on the second type BWP. Therefore, there is usually only one UE receiving the end of service indication information of the first type BWP. This is very suitable for a scenario that: the services on the first type BWP have not ended, but the UE needs to switch to the second type BWP as soon as possible due to a need to receive higher priority services, such as ultra-reliable low latency communications (URLLC) services, etc.

Further, the above-described service end indication information may be carried by a MAC CE on the first type MVP. The MAC CE is transmitted in a PDSCH. The time-frequency positions, MCS, etc. corresponding to the PDSCH is indicated by a PDCCH. The PDCCH may use a RNTI as a mask for the CRC of the PDCCH. The RNTI may be one of the following two types: a first type RNTI corresponding to a PDCCH used for scheduling services on the first type MVP; and a second type RNTI that is a cell RNTI allocated by the base station to the UE for the second type BWP.

Further, the base station may configure in advance for the UE of a RNTI type related to the service end indication information of the first type BWP. There may be three cases. In case A, the RNTI is configured as the first type RNTI. In case B, the RNTI is configured as the second type RNTI. In case C, the RNTI is configured as either the first type RNTI or the second type RNTI.

For case A, the UE needs to detect the received PDCCH using the first type RNTI. For case B, the UE needs to detect the received PDCCH using the second type RNTI. For case C, when transmitting the service end indication information of the first type BWP, the base station may use either the first type RNTI or the second type RNTI. The selection of RNTI type at the base station may be random and unknown to the UE for case C. Correspondingly, the UE needs to detect the received PDCCH using the first type RNTI and the second type RNTI respectively.

At the UE side, the UE performs a detection on the PDCCH and/or all. MAC CEs corresponding to the PDCCH. Upon a detection of the service end indication information, the terminal UE switches to a second type BWP according to a predetermined agreement between the base station and the UE. The second type BWP may be one of the following: a latest second type BWP where the UE resided on before switching to the first type BWP; an initial second type BWP configured for the UE by the base station; and a default second type BWP configured for the UE by the base station. Each of the above listed second type BWP is one of a pair of BWPs, i.e. a downlink BWP and a corresponding uplink MVP.

Further, in the same time slot, if the UE detects both the signaling carrying the service end indication and an additional signaling that is inconsistent with the signaling, the UE performs processing according to the signaling of the service end indication and ignores the additional signaling that is inconsistent with the signaling. In one example, the signaling carrying the service end indication may be transmitted to the UE only, while the additional signaling is transmitted to a plurality of UEs including the UE.

Based on this embodiment, the UE can quickly switch to the second type BWP at the end of the service of the first type BWP. The base station can thus quickly use the second type BWP to schedule the UE, which improves resource efficiency. This can also help the LT to decrease its power consumption on unnecessary detections at the first type BWP.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the an, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first" "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that, can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, the method comprising:

configuring a first type bandwidth part (BWP) for a wireless communication device, wherein the first type BWP includes a single BWP configured for downlink transmission to the wireless communication device;

configuring at least two second type BWPs for the wireless communication device, wherein the at least two second type BWPs include two BWPs configured respectively for uplink and downlink transmissions regarding the wireless communication device;

transmitting indication information on a second type BWP in the at least two second type BWPs to the wireless communication device, wherein the indication information indicates a service type of a planned transmission of the wireless communication node on the first type BWP that the wireless communication device uses the indication information to determine whether to switch from the at least two second type BWPs to the first type BWP to receive data of the planned transmission on the first type BWP; and awaiting feedback from the wireless communication device, wherein a presence or an absence of the feedback indicates whether or not the wireless communication device will switch to the first type BWP to receive the data.

2. The method of claim 1, wherein among the first type BWP and the at least two second type BWPs, at most one BWP is active for a link direction at one time.

3. The method of claim 1, wherein each BWP of the first type BWP and the at least two second type BWPs is configured with at least one selected from the group of:
time frequency domain position information;
a control resource set (CORESET); and
a search space.

4. The method of claim 1, wherein:
the first type BWP is configured for transmissions based on broadcast or multicast; and
each BWP in the at least two second type BWPs is configured for unicast transmissions.

5. The method of claim 1, wherein:
the indication information is carried by a physical downlink control channel on a control resource set (CORESET) of the second type BWP;
a cyclic redundancy check (CRC) of the physical downlink control channel is scrambled by a predetermined radio network temporary identifier (RNTI); and
the predetermined RNTI is different from a RNTI used for scrambling a CRC of a second physical downlink control channel for scheduling service on the second type BWP.

6. The method of claim 1, wherein:
the indication information is carried by a media access control (MAC) control element (CE) on a physical downlink shared channel on the second type BWP based on a hybrid automatic repeat request (HARQ) mechanism.

7. The method of claim 1, wherein:
the indication information comprises a RNTI to be used for scrambling a CRC of a physical downlink control channel for the planned transmission of the wireless communication node on the first type BWP.

8. The method of claim 1, further comprising:
receiving the feedback from the wireless communication device.

9. The method of claim 1, further comprising:
determining that no feedback is received from the wireless communication device regarding the indication information; and determining, based on a predetermined agreement, whether the wireless communication device will switch to the first type BWP to receive data.

10. A wireless communication node configured to carry out the method of claim 1.

11. A method performed by a wireless communication device, the method comprising:
receiving a configuration of a first type bandwidth part (BWPs) from a wireless communication node, wherein the first type BWP includes a single BWP configured for downlink transmission to the wireless communication device;
receiving a configuration of at least two second type BWPs for the wireless communication device, wherein the at least two second type BWPs include two BWPs configured respectively for uplink and downlink transmissions regarding the wireless communication device;
receiving indication information on a second type BWP in the at least two second type BWPs from the wireless communication node, wherein the indication information indicates a service type of a planned transmission of the wireless communication node on the first type BWP; and
determining whether to transmit feedback to the wireless communication node, wherein a presence or an absence of the feedback indicates whether or not the wireless communication device will switch from the at least two second type BWPs to the first type BWP to receive data of the planned transmission on the first type BWP.

12. The method of claim 11, wherein among the first type BWP and the at least two second type BWPs, at most one BWP is active for a link direction at one time.

13. The method of claim 11, wherein each BWP of the first type BWP and the at least two second type BWPs is configured with at least one selected from the group of:
time frequency domain position information;
a control resource set (CORESET); and
a search space.

14. The method of claim 11, wherein:
the first type BWP is configured for transmissions based on broadcast or multicast; and
each BWP in the at least two second type BWPs is configured for unicast transmissions.

15. The method of claim 11, wherein:
the indication information is carried by a physical downlink control channel on a control resource set (CORESET) of the second type BWP;
a cyclic redundancy check (CRC) of the physical downlink control channel is scrambled by a predetermined radio network temporary identifier (RNTI); and
the predetermined RNTI is different from a RNTI used for scrambling a CRC of a second physical downlink control channel for scheduling service on the second type BWP.

16. The method of claim 11, wherein:
the indication information is carried by a media access control (MAC) control element (CE) on a physical downlink shared channel on the second type BWP based on a hybrid automatic repeat request (HARQ) mechanism.

17. The method of claim 11, wherein:
the indication information comprises a RNTI to be used for scrambling a CRC of a physical downlink control channel for the planned transmission of the wireless communication node on the first type BWP.

18. The method of claim 11, further comprising:
transmitting the feedback to the wireless communication node.

19. The method of claim 11, further comprising:
determining, based on a predetermined agreement, that there is no need to transmit the feedback.

20. The method of claim 11,
wherein the determining whether to switch from the at least two second type BWPs to the first type BWP comprises: determining to switch to the first type BWP to receive the data, and
wherein the method further comprises: in response to determining to switch to the first type BWP, deactivating the second type BWP such that the first type BWP becomes active after a switch delay.

21. A wireless communication device configured to carry out the method of claim 11.

* * * * *